United States Patent Office 3,139,415
Patented June 30, 1964

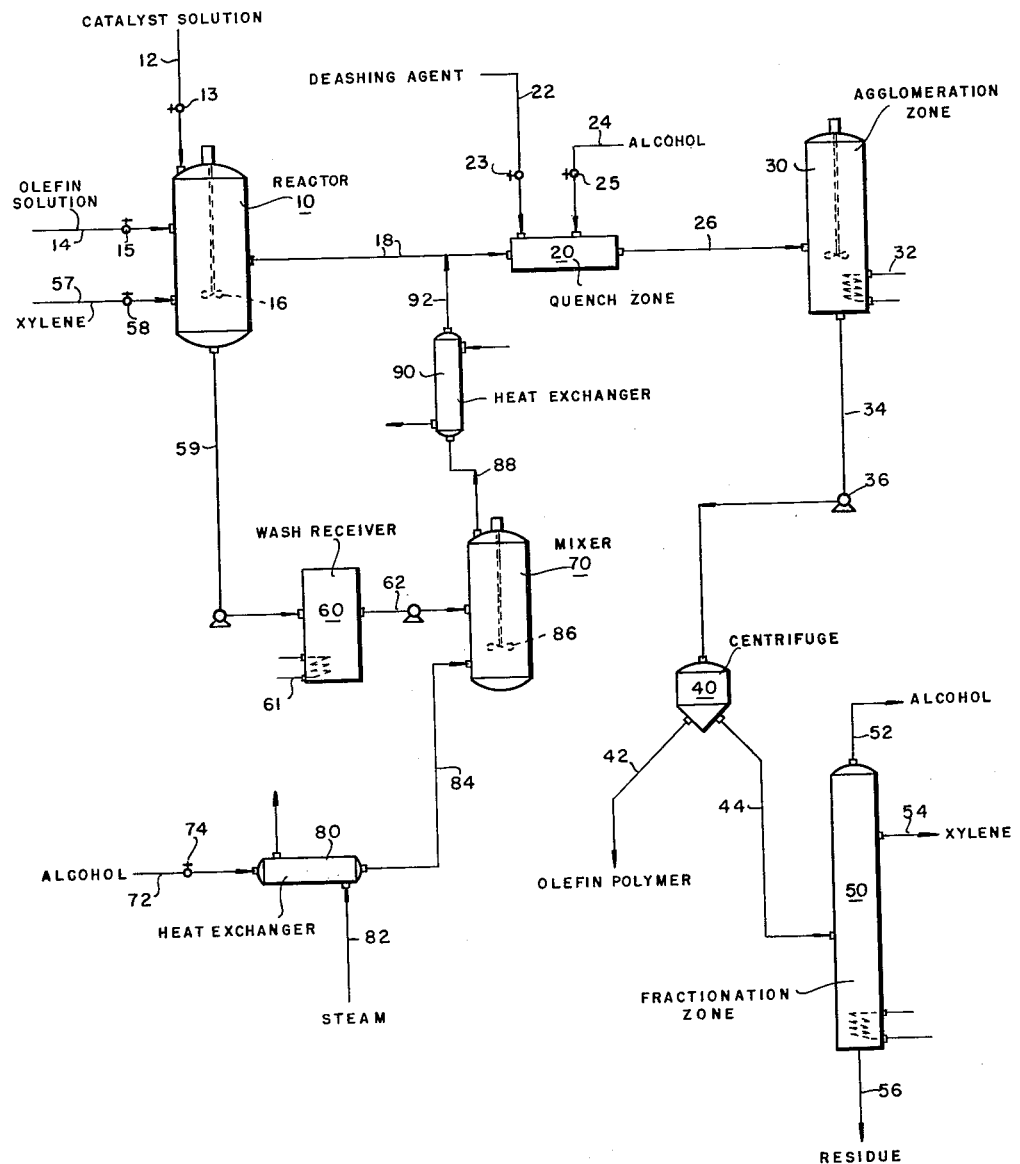

3,139,415
POLYOLEFIN RECOVERY PROCESS
Raymond A. Speed and Eugene E. Poirot, Baytown, Tex., assignors to Esso Research and Engineering Company, Elizabeth, N.J., a corporation of Delaware
Filed Aug. 5, 1960, Ser. No. 47,788
8 Claims. (Cl. 260—45.5)

This invention relates to the production of polyolefins. More particularly, this invention is a process for recovering the polyolefins which form on the reactor surfaces as a soft mass of solvated polymer during the reaction.

In producing polyolefins such as polyethylene and polypropylene or mixtures thereof, the efficiency of the operating production line decreases with time. This is caused by the accumulation of the mass of solvated polymer on the heating surfaces of the reactor comprising a part of the production line. In some cases the amount of polymer which accumulates on these reactor surfaces amounts to as much as 4 percent to 5 percent, although operation with much higher or much lower polymer accumulation is contemplated.

The accumulated polymer on the reactor heating surfaces decreases the heat exchange efficiency of the reactor. Thus, it is necessary to shut down the production of the polyolefin to clean the accumulated polymer from the reactor surfaces. In large plant operations, it may be necessary to clean the reactor surfaces as often as every 2 to 4 days.

The reactor surfaces are cleaned by contacting the polymer with a heated liquid cyclic hydrocarbon. The hydrocarbon must be heated to a temperature sufficiently high to remove the polyolefin from the reactor surfaces and form a hot solution of dissolved polyolefins in the liquid cyclic hydrocarbon. In order to assure that the final traces are removed, the temperature can be increased to above the melting point of the polyolefin.

It would be highly desirable if the polyolefins adhering to the reactor surfaces could be recovered and returned to the operating production line. Unfortunately, however, since the liquid cyclic hydrocarbon must be at a temperature between about 250° F. to 300° F. in order to dissolve the polymer deposits, the dissolved polyolefin cannot be recovered by currently uitilized means. This is so because when the dissolved polyolefin in the liquid cyclic hydrocarbon cools from the 250° F. to 300° F. temperature, the polymer does not precipitate into a decantable precipitate. Rather, an unmanageable gel type mass is formed. The gel type mass causes a severe plugging of the pump equipment and other equipment in the operating production line.

During normal production of the polyolefin, an alcohol is used to precipitate the dissolved polymer from a solution of dissolved polymer in a diluent. However, during normal operations, the temperature within the reactor seldom exceeds 180° F. This is a temperature of between 70° and 120° lower than the temperature required to remove the polymer which has accumulated on the reactor surfaces. If the solution of dissolved polymer in a diluent is heated to a temperature of above 180° F. and then cooled, the polymer does not precipitate but rather forms the gel type mass. When alcohol is added after the solution has cooled, it has no effect on breaking these gels.

The process to be described herein is a process for recovering the polyolefin which sticks to the reactor surfaces. The process may be incorporated as a part of the normally used polyolefin production line. In using this process, a polymer solution is obtained from the polymer removed from the reactor surfaces. Upon cooling, the polymer precipitates and can be removed.

Briefly, in carrying out our new process, the polyolefin is first contacted with the hot liquid cyclic hydrocarbon which has been heated to a temperature sufficiently high to remove the polyolefin from the heating surfaces and form a hot solution of dissolved polyolefins in the liquid cycle hydrocarbon. This hot solution of the dissolved polyolefin in the liquid cyclic hydrocarbon is mixed with a hot liquid alcohol to form a mixture of dissolved polyolefin in liquid alcohol-liquid cyclic hydrocarbon. When this mixture is cooled, the polyolefin is precipitated. The polyolefin is then separated from the mixture.

The invention as well as its many advantages may be further understood by reference to the following detailed description and single drawing which is a schematic flow sheet illustrating one manner in which the process of the present invention may be conducted.

Referring to the drawing, the operating production line of one type of polyolefin system currently utilized includes a reactor 10, a quench zone 20, an agglomeration zone 30, a centrifuge 40, and a fractionation zone 50.

The reactor 10 is provided with an inlet line 12 for the continuous admission of a solution of catalyst composition and an inlet line 14 for the continuous addition of a solution of the olefin to be polymerized. Agitation of the reaction medium may be accomplished mechanically by use of a motor operated stirrer 16.

The polymer slurry is continuously withdrawn from the reactor 10 and flowed by way of a line 18 to the quench zone 20 of any suitable construction. In flowing through the quench zone 20, the withdrawn slurry is treated with a suitable quenching medium for de-activating the catalyst. Thus, for example, a deashing agent may be introduced to the quench zone 20 by way of a charge line 22 controlled by a valve 23. Downstream from the charge line 22 a $C_1$ to $C_6$ alcohol may be added by way of a charge line 24 controlled by valve 25. As a consequence of this treatment, the catalyst components of the slurry are substantially completely deactivated on discharge of the slurry from the quench zone 20 by way of a discharge line 26 leading to the agglomeration zone 30 of any suitable construction. The slurry is maintained in the agglomeration zone 30 for a residence time within the range of 15 to 60 minutes sufficient to provide a slurry of readily filterable agglomeration polymer particles in the liquid component. Heat may be supplied to the agglomeration zone 30 by any suitable means such as, for example, a steam coil 32.

A stream of agglomerated slurry is continuously withdrawn from the zone 30 by way of a discharge line 34 provided with a pump 36 leading to a polymer separation zone 40 provided with suitable means such as a basket type centrifuge for separating the polymer particles from the liquid components of the slurry.

In the separation zone 40, the slurry is resolved into an olefin polymer fraction discharged by way of line 42 and a liquid fraction discharged by way of line 44 leading to the fractionating zone 50 of any suitable construction. The liquid components of the slurry may be fractionated in the zone 50 to provide an alcohol fraction discharged by way of the line 52, a hydrocarbon diluent fraction discharged by way of the line 54, and a residue fraction discharged by way of the line 56.

As stated heretofore, polyolefins accumulate on the reactor surfaces to interfer with the heat exchange efficiency, and, of course, reduce the total amount of polyolefins obtainable in the production line. This accumulated polyolefin may be removed from the reactor 10 by dissolving it in a suitable liquid cyclic hydrocarbon at a high temperature. This temperature usually ranges between 250° F. to 300° F.

In accordance with the present invention equipment is included as a part of the operating production line, which equipment enables us to perform a process for removing the dissolved polymer from the solvent without the formation of the gel type mass which prior to this invention, used to be formed upon cooling.

The additional equipment includes a wash receiver 60, a mixer 70, and indirect heat exchangers 80, and 90.

In carrying out the recovery process, the formation of new polymer in reactor 10 is terminated by closing valves 13 and 15 in lines 12 and 14, respectively. As much as possible of the diluent and polymer is then dumped from the reactor. The hot liquid cyclic hydrocarbon is then added to the reactor 10 by means of a line 57 controlled by valve 58.

The liquid cyclic hydrocarbon may consist of cyclohexane or an aromatic diluent such as benzene, toluene, and xylene. The use of xylene is preferred. The reactor 10 may be completely filled with the xylene which is kept at a high temperature (usually between about 250° F. and 300° F.). The xylene is allowed to remain in contact with the heating surfaces for a period of time ranging from 15 minutes to 60 minutes.

The hot solution of polyolefins in xylene is then pumped through line 59 to the wash receiver 60. This solution usually contains betwen 3 to 6 percent of polymer by weight. The wash receiver is heated by means of heating coils 61. The hot solution of polyolefin in xylene is pumped through line 62 to the mixer 70. The pumping of the solution is done continuously at a low rate from the wash receiver 60 to the mixer 70. Simultaneously, alcohol is flowed through line 72 controlled by valve 74 through the heat exchanger 80. The heat exchanger is provided with a steam conduit 82. The heated alcohol from heat exchanger 80 is fed at a temperature ranging from 250° F. to 300° F. through line 84 to the mixer 70.

The solution of dissolved polyolefin in xylene is mixed into intimate contact with the alcohol by means of a motor operated stirrer 86 contained within the mixer 70. The alcohol may be any $C_1$ to $C_5$ alcohol. However, methanol is preferred. The ratio of alcohol ranges from 0.5 to 5 moles of alcohol per mol of xylene.

The solution of dissolved polyolefin in xylene, and the methanol is mixed in the mixer while the temperature is maintained between 250° F. and 300° F. A pressure is maintained in the mixer 70 which is slightly greater than or substantially equal to the vapor pressures of the xylene-alcohol solution. The actual pressure is dependent upon the temperature and the amount of alcohol used. For example, if 25 percent by weight methanol is used, the pressure ranges from 100 p.s.i.g. to 135 p.s.i.g. for temperatures ranging from 280° F. to 300° F.

The mixture is conducted from the mixer 70 through line 88 to heat exchanger 90 where it is cooled to about 170° F. into a manageable slurry. The slurry is fed from exchanger 90 through line 92 and joins the regular polyolefin production line 18 at a point just before the quench zone 20. The cooled slurry can then be fed through the quench zone 20 and line 26 to the agglomeration zone 30. The agglomerated polyolefin is then fed through line 34 to the centrifuge 40 where the precipitated polyolefin is removed through line 42. The liquid portion is fed through line 44 to the fractionation zone 50. In the fractionation zone, the alcohol is removed through line 52, the xylene through line 54, and the residue through line 56.

We claim:

1. A process for recovering polyolefin sticking to the heating surfaces of a reactor comprising the steps of: contacting the polyolefin with liquid cyclic hydrocarbon heated to a temperature ranging from 250° F. to 300° F. for a period of time sufficient to remove the polyolefin from said surface and form a hot solution of dissolved polyolefin in the liquid cyclic hydrocarbon; mixing hot liquid alcohol at a temperature ranging from 250° F. to 300° F. with the hot solution to form a mixture of dissolved polyolefin in liquid alcohol-liquid cyclic hydrocarbon, the ratio of alcohol to liquid cyclic hydrocarbon ranging from 0.5 to 5 moles of alcohol per mole of liquid cyclic hydrocarbon; cooling said mixture to precipitate the polyolefin; and separating the polyolefin from the mixture.

2. A process in accordance with claim 1 wherein the liquid cyclic hydrocarbon is an aromatic hydrocarbon.

3. A process in accordance with claim 2 wherein the aromatic hydrocarbon is xylene.

4. A process in accordance with claim 1 wherein the alcohol is methanol.

5. A process in accordance with claim 2 wherein the alcohol is methanol.

6. A process in accordance with claim 3 wherein the alcohol is methanol.

7. A process for recovering polyolefin sticking to the heating surfaces of a reactor comprising the steps of: filling the reactor with xylene having a temperature ranging from 250° F. to 300° F. and allowing said xylene to remain in contact with the heating surfaces for a period of time ranging from 15 minutes to 60 minutes; then flowing the resulting hot solution of dissolved polyolefin in xylene to a mixer while simultaneously flowing alcohol having a temperature ranging from 250° F. to 300° F. to said mixer, the ratio of alcohol to xylene ranging from 0.5 to 5 moles of alcohol per mole of xylene; mixing the solution of dissolved polyolefin in xylene with the alcohol in said mixer while maintaining the mixture at a temperature ranging from 250° F. to 300° F. and a pressure substantially equal to the vapor pressures of the xylene-alcohol solutions; cooling said mixture to precipitate the polyolefin; and separating the polyolefin from the mixture.

8. A process in accordance with claim 7 wherein the alcohol is methanol.

References Cited in the file of this patent

UNITED STATES PATENTS

| | | |
|---|---|---|
| 2,801,234 | Hanson | July 30, 1957 |
| 2,886,561 | Reynolds et al. | May 12, 1959 |
| 2,890,214 | Brightbill et al. | June 9, 1959 |
| 2,904,542 | Fasce | Sept. 15, 1959 |
| 3,030,348 | Mills | Apr. 17, 1962 |